April 30, 1963　　　　　H. G. NEIL　　　　　3,088,035

MEASURING INSTRUMENTS

Filed Sept. 29, 1959

INVENTOR

HUGH G. NEIL

BY *Swecker + Mathis*

ATTORNEYS

United States Patent Office 3,088,035
Patented Apr. 30, 1963

3,088,035
MEASURING INSTRUMENTS
Hugh G. Neil, Knoxville, Tenn., assignor to The University of Tennessee Research Corporation, Knoxville, Tenn., a corporation of Tennessee
Filed Sept. 29, 1959, Ser. No. 843,105
9 Claims. (Cl. 250—210)

This invention relates to measuring instruments, and, more particularly, to instruments for measuring length distribution characteristics of staple fiber populations.

A representative sample of cotton fibers will contain fibers of many different lengths. It frequently is desirable to obtain information relating to the distribution of fiber lengths in such a sample, so as to provide criteria for the setting of fiber-working machinery and for such purposes as economic evaluation of the cotton. Hertel Patent No. 2,299,983, granted October 27, 1942, and Puster Patent No. 2,648,251, granted August 11, 1953, disclose instruments for obtaining this sort of information.

In each of these instruments a substantially planar sample of parallelized fibers is scanned by a beam of light extending approximately at right angles to the plane of the fibers, and light-sensitive means are disposed so as to receive the light passing through the zone occupied by the sample. The amount of light reaching the light-sensitive means constitutes a measure of the number of fibers scanned by the beam of light. By moving the sample in a direction parallel to the lengths of the fibers, while maintaining the light beam or scan line stationary, it is possible to obtain useful information as to the length distribution characteristics of the sample.

For example, with the scan line disposed a given distance from the sample holder, the amount of light reaching the light-sensitive means would be a function of the number of fibers protruding from the holder at least as far as said given distance. By changing such distance, a composite picture of the sample may be obtained, because at each station the amount of light is a function of the number of fibers protruding far enough to intercept the light beam.

It will be understood in this connection that the term "number of fibers" is used in a descriptive rather than an absolute sense. The quantity detected by the beam of light would be affected by the cross sectional dimensions of the fibers as well as by the number of fibers, but in instruments of this type it is assumed that this quantity is equivalent to the number of fibers, because of the relative constancy of other factors.

The instruments must include means for evaluating or measuring the amount of light passing through the sample, and they also must include means for translating the amount of light received by the light-sensitive means into a value directly proportional to the number of fibers in the light beam. In the prior patents mentioned above, the first of these requirements, that is, measurement of the amount of light passing through the sample, was satisfied through the use of balance systems. In each of the patents, there is disclosed an instrument which is provided with a secondary, or reference-establishing, light path capable of being regulated to change the amount of light passing to a second, or reference-establishing, light-sensitive means. Since the amount of light passing through the second path could be regulated, it could be made to equal the amount of light passing through the fiber sample to the first light-sensitive means. Consequently, the amount of regulation required in order to bring the light on the second cell into balance with the light on the first cell could be used as a measure of the amount of light reaching the first light-sensitive cell.

The other requirement, that is, the problem of translating the amount of light into a value corresponding to the number of fibers in the light beam, is complicated by the fact that the amount of light reaching the light-sensitive means is a complex, logarithm type, function of the number of fibers in the beam. In order to compensate for this, the prior patents proposed the use of a cam in the control system for the second light path. The cam was shaped and arranged in such a manner that a unit of input motion to the system would result in an adjustment of the second light path comparable to the change produced in the first light path by a unit change in the number of fibers disposed in the first light path. In other words, the cam was employed to generate mechanically a logarithmic function comparable to that generated optically by the light system. Consequently, when the amount of light reaching the first light-sensitive means was equal to the amount of light reaching the second light-sensitive means, the displacement due to the input motion required to bring about such balance actually constituted a straight line function of the number of fibers in the first light path.

However, these systems have some disadvantages. These are due in large measure to the necessity for the use of the cams in the light balancing structures. Such cams must be formed with considerable care if they are to produce satisfactory results. This increases the manufacturing costs, and in addition, it renders the instrument somewhat inflexible. Once the curvature of the cam has been established, the instrument is bound to it unless one wishes ot substitute a new cam or re-shape the old one.

It is an object of the present invention to overcome the disadvantages noted above by eliminating the need for carefully shaped cams.

Another object of the invention is to provide a fiber length distribution measuring instrument which includes only one light path and in which the amount of light passing through the sample is evaluated without comparing it with a reference amount of light.

A more specific object of the present invention is to provide such an instrument in which the amount of light passing through the sample may be evaluated by adjustable electrical components.

Another object of this invention is to provide electrical means for generating logarithmic functions.

Another object of the invention is to provide a fiber length distribution measuring instrument in which a unit of motion of an adjustable element in an electric circuit will result in an electrical effect directly comparable to the change produced by a unit change in the number of fibers disposed in the light path.

The foregoing objects may be accomplished, according to a preferred embodiment of the invention, by the provision of a measuring instrument in which a fiber sample is sensed by a light beam in the same manner as in the prior art, but in which the light reaching the light-sensitive means is evaluated by a novel electrical circuit. This circuit is arranged to cooperate with the light-sensitive unit in such a way that the output potential of the light-sensitive unit will be a standard value, preferably zero voltage, whenever the system is in balance. Deviations from this standard potential represent conditions of imbalance in the system, and the direction of deviation gives an indication of the nature of the imbalance.

The electrical properties of the circuit facilitate the evaluation of the amount of light reaching the cell and also the translation of the light value into an indication of the number of fibers in the light beam. The circuit includes adjustable means and is of such a nature that the amount of displacement of the adjustable means from a reference point is a measure of the number of fibers in the light beam whenever the system is in balance.

The circuit preferably also is provided with a number of other regulatable components by which the instrument may be calibrated conveniently at the point where the instrument is to be used.

A more complete understanding of the invention and a better appreciation of its advantages will be gained from a consideration of the following detailed description of the embodiment illustrated in the accompanying drawings, in which.

Figure 1:
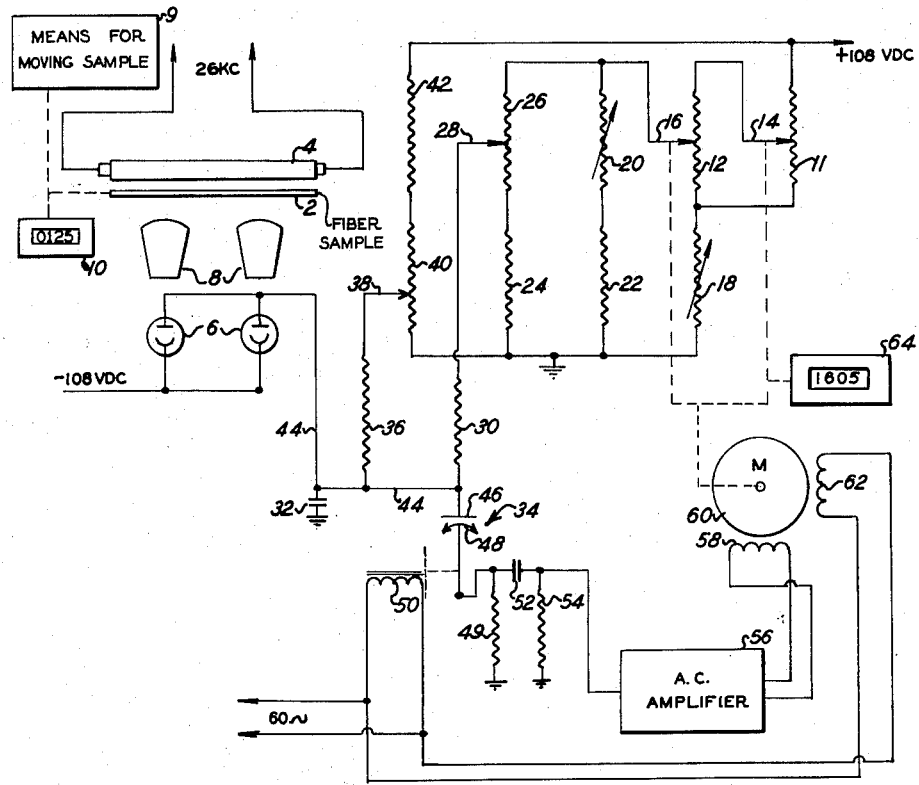
FIG. 1 is a circuit diagram illustrating the principles of the invention.

In FIG. 1 a fiber sample is diagrammatically illustrated at 2. This sample may be prepared and held in the same manner that such samples have been held in the instruments known heretofore. A light source 4 is disposed adjacent the sample 2 for directing light through the fibers and onto light-sensitive means 6. In the preferred form of the invention, the light source 4 is a daylight fluorescent bulb driven by a high frequency energizing current in order to minimize or eliminate flicker. An energizing current of twenty-six kilocycles per second has been found to be suitable for this purpose. After passing through the fibers the light may be focused by suitable lenses 8 and directed upon the light-sensitive means 6. As illustrated, the light-sensitive means 6 are photoelectric cells, and their cathodes are connected to a source of negative potential.

The physical construction and arrangement of the sample holding and sensing components may be conventional. For example, the construction disclosed in Puster Patent No. 2,648,251, is suitable for the purpose of the present invention.

It should be understood also that the invention may be applied in instruments where something other than visible light constitutes the sensing medium. For example, the scanning beam may be formed by beta rays emanating from a suitable source such as radio strontium. In such a case, ionization chambers, instead of the photo cells, would be used as the response means.

Whatever the sensing medium may be in a particular instrument, the sample 2 must be movable relative to the scan line, and any suitable means 9 may be employed for producing this movement. The instrument also should include some means for indicating the position of the sample relative to the scan line, and such means is depicted in FIG. 1 as a conventional indicator 10.

It is a feature of this invention that the electrical circuit be capable of generating a logarithmic function. The light reaching the cells 6 varies as a logarithmic function of the number of fibers in the scan line, and the circuit of this invention greatly facilitates the translation of the amount-of-light values sensed by the cells into number-of-fibers values.

The circuit in FIG. 1 includes a pair of potentiometers 11 and 12 connected together so as to form a squaring potentiometer unit. The coil of the first potentiometer 11 is connected to a positive potential source, and the corresponding end of the coil of the second potentiometer 12 is connected to the tap 14 on the potentiometer 11. A tap 16 on the potentiometer 12 is mechanically connected to the tap 14 on the potentiometer 11, as indicated by the broken lines in FIG. 1, so that the two move in unison.

The opposite ends of the coils 11 and 12 of the squaring potentiometer unit are connected to ground through a variable resistor 18. This resistor 18 will be referred to as the "LO-CAL" calibration adjustment of the system. Its presence in the circuit affects the output potential of the squaring potentiometer unit and makes it possible to balance the instrument under conditions where an intermediate number of fibers are disposed in the light path. Adjustment of the resistor 18 normally takes place only during calibration of the instrument.

Another adjustable resistor 20 is disposed in a branch path extending from the tap 16 to ground. This branch path also includes a fixed resistance element 22. Together, the resistors 20 and 22 provide a load which alters the output potential curve of the squaring potentiometer unit. This load may be adjusted as required during calibration of the instrument.

Connected in parallel with the load branch is another branch containing a fixed resistor 24 and a potentiometer 26. This potentiometer will be referred to as the "ZERO" control. The first step normally taken in measuring a sample is to bring the system to a base or "ZERO" condition by adjusting the position of the tap 28 on the potentiometer 26. With no fibers in the light path and with the taps 14 and 16 at one end of their paths of travel, the tap 28 is adjusted to bring the system into balance.

The tap 28 on the "ZERO" potentiometer 26 is connected to the plate circuit of the photocells 6 through a high value resistor 30. The plate circuit for the cells 6 includes a capacitor 32 connected to ground, and an electrostatic alternator 34 which will be described in greater detail below.

The bias circuit for the plates of the photocells 6 also plays a significant role in calibrating the system. This circuit includes a high value resistor 36 connected to the tap 38 of a potentiometer 40 which will be referred to as the "HI-CAL" calibrating adjustment. One end of the coil of the potentiometer 40 is connected to ground, and the other end is connected to a source of positive potential through a resistor 42. By varying the position of the tap 38 along the coil of the potentiometer 40, it is possible to obtain a variation in the bias of the plate circuit. The ability to adjust this bias is of significance primarily in connection with the calibration of the instrument for proper operation under conditions in which many fibers intersect the scan line.

Although the values of the various circuit components shown in FIG. 1 may be varied without departing from the principles of the invention, it may be helpful to a complete understanding of the invention to specify here a set of values which has been found to be satisfactory in practice.

The fixed resistance units 22, 24, 30, 36 and 42 may have the following resistance values: resistor 22, 100 kilohms; resistor 24, 100 kilohms; resistor 30, 54 megohms; resistor 36, 66 megohms; and resistor 42, .5 megohm.

The squaring potentiometers 11 and 12 are each 20 kilohm, ten turn potentiometers. The zero control 26 may be a 200 kilohm, ten turn potentiometer, and the "HI-CAL" adjustment 40 may be a 100 kilohm potentiometer.

The "LO-CAL" control 18 is a variable resistor whose resistance may be varied from zero to about 10 kilohms. The load resistor 20 is a variable resistor which may be varied from zero to .5 megohm. The capacitance 32 preferably has a value of about .0005 microfarad.

When the unit is in operation, there is a point in the circuit where the potential will reach a standard value whenever the system is in balance. In FIG. 1 any point along the line 44 connected to the plates of the phototubes 6 may be considered such a point. The exact value of this potential is not of fundamental importance. It may be of whatever value is most suitable in the instrument as a whole. However, in FIG. 1 this potential is assumed to be zero or ground potential, because this particular value is most suitable for the response means illustrated in FIG. 1.

It should be pointed out also that the disposition made of the signal appearing on the line 44 may vary in accordance with the constructional features of the instrument as a whole. In the instruments disclosed in the Hertel and Puster patents mentioned above, there were no provisions for automatically bringing about balance conditions. Any imbalance was reflected in the movement of the needle of a galvanometer, and the operator of the instrument would then restore the balance by moving the adjustable element of the balance system. If the present invention is to be utilized in like manner, all that need be done is to provide a meter for measuring the potential in the line 44. If deviations from the desired potential are noted, the operator may restore the balance by manually changing the positions of the taps 14 and 16 on the squaring potentiometers 11 and 12, or by manually changing the position of the sample 2 relative to the light beam so as to alter the amount of light falling on the cells 6. However, the present invention is particularly suited for use in instruments which are designed to operate automatically to restore balance conditions. Such an instrument is shown in FIG. 1.

In order to utilize the D.C. signal on the line 44 conveniently, it is desirable to convert it into an A.C. signal. This may be accomplished in various ways which are so well known as to require no elaboration here. However, the alternator 34 has certain distinct advantages in the system of FIG. 1, and a description of its operation may be helpful.

The electrostatic alternator 34 includes fixed plate means 46 connected to the line 44, and movable plate means 48 connected to ground through a high value resistor 49 and being spaced a variable distance from the fixed plate means 46. A solenoid 50 energized from an alternating current source coacts with a permanent magnet mechanically connected to the movable plate means 48 to change the spacing between the plate means 46 and 48. This spacing varies rhythmically between a maximum value and a minimum value, the variations taking place in response to the mechanical shifts in the position of the plate means 48 due to the reversals in polarity of the solenoid 50.

As long as the potential in line 44, and consequently on the fixed plate 46 of the electrostatic alternator 34, is zero or ground potential, the unit 34 will have no output. However, if the potential on the fixed plate 46 rises to some positive value, a positive charge will flow onto the plate means 46. In turn, negative charges will be drawn up through the resistor 49 to plate means 48 in order to equalize the charge on 46. It will be remembered that the capacitance between the plates 46 and 48 is alternating and that even though the voltage in 44 is constant, charge will have to flow continually in and out through the resistor 49. There results an alternating current which gives rise to an alternating voltage of the same frequency as that of the alternator. The magnitude of this A.C. voltage will depend on the magnitude of the voltage at 44, on the change in capacitance between plates 46 and 48, and also on the value of the resistor 49.

Similar effects are produced when the charge on the fixed plate 46 of the electrostatic alternator 34 assumes a negative value. The potential on the movable plate 48 will again represent an A.C. voltage having a frequency the same as the frequency of the line voltage employed for the energization of the solenoid 50. In this instance, however, the A.C. voltage at the movable plate 48 will be one hundred and eighty electrical degrees out of phase with the signal produced when the charge on the fixed plate 46 was positive. This phase difference enables the system to distinguish between positive and negative signals, and thus to distinguish the direction of imbalance in the system.

The output from the electrostatic alternator 34 is coupled by a capacitance 52 and a high value resistor 54 to an A.C. amplifier 56 of conventional construction. This signal is there amplified, and is fed to one of the coils 58 of a two phase motor 60, the other coil 62 of which is energized by the sixty cycle line current.

The motor 60 is mechanically coupled to the taps 14 and 16 on the squaring potentiometer unit and also is coupled to an indicator 64 of conventional construction. Therefore, the indication on the face of the indicator 64 and the positions of the taps 14 and 16 on the potentiometers 11 and 12 are corresponding quantities. The indicator 64 provides a "number-of-fibers" indication, and the number so indicated is related to the positions of the taps 14 and 16 along the coils of the potentiometers 11 and 12.

The operation of the circuit of FIG. 1 now should be apparent. If the number of fibers of the sample 2 in the scan line exceeds the number indicated upon the face of the indicator 64, the amount of light reaching the photocells 6 will be less than that which could be compensated for by the momentary condition of the circuit. As a result, a positive potential will appear on the fixed plate 46 of the electrostatic alternator 34 and a signal will be produced which will drive the motor 60 in a direction that will tend to restore the system to a balanced condition. As the taps 14 and 16 of the squaring potentiometers 11 and 12 move downwardly, the reading on the indicator 64 will increase a corresponding amount. Finally, a position of the taps 14 and 16 will be reached at which there is no longer any potential on the fixed plate 46 of the electrostatic alternator 34, and the motor 60 will stop.

If the number of fibers disposed in the scan line is now decreased, the system will operate in a reverse fashion. A negative charge will appear upon the fixed plate 46 of the electrostatic alternator so as to bring about the generation of a signal which will drive the motor 60 in an opposite direction. This will move the taps 14 and 16 on the squaring potentiometers 11 and 12 and will cause the reading of the indicator 64 to decrease. Again, operation will continue only so long as the system remains out of balance. When the potential on the plate 46 becomes zero, the motor 60 will stop.

It will be noted that the indication of sample position appearing on indicator 10 and the indication of the position of the taps 14 and 16 on the squaring potentiometer unit appearing on indicator 64 are numerical or digital quantities. Although this is preferred normally, the invention is not necessarily limited to such an arrangement. Instruments such as those disclosed in the Hertel and Puster patents mentioned above are designed to produce a graphic indication. One coordinate of such a graph is the distance through which the fiber sample is moved relative to the scan line, and the other coordinate is the distance of movement of the balancing means. If the present invention is to be utilized in such an instrument, the means for moving the fiber sample 2 can be coupled mechanically to a marking device and the means for moving the taps 14 and 16 can be coupled mechanically to a chart holder. The physical arrangement would be comparable to those employed in the Hertel and Puster patents and the graphs or charts produced would be similar.

In calibrating the instrument of FIG. 1, use preferably is made of sheets of white linen-embossed cellophane. This material has light transmitting properties comparable to those of the fiber samples and it provides a convenient standard for calibration purposes.

The first step normally taken in calibrating the instrument is to establish a preliminary setting for the tap 28 on the "ZERO" potentiometer 26. This is accomplished by adjustment of the tap 28 at a time when there are no fibers in the light path and when the taps 14 and 16 of the squaring potentiometer unit are at the upper ends of their paths of travel. Adjustment of the tap 28 under these conditions is continued until a condition of balance is attained, that is, until the potential in the line 44 connected to the plates of the light-sensitive cells 6 is zero or ground potential.

The next step involves adjustment of the load resistor 20. At this time, a relatively small resistance is placed in the light path, and the resistor 20 is adjusted until a condition of balance is attained with the reading on the indicator 64 conforming to the resistance in the light path.

For example, two sheets of linen-embossed cellophane may be placed in the light path in lieu of the sample 2, and the instrument may be brought to a condition of balance with the indicator 64 reading "0200."

It now may be necessary to re-adjust the "ZERO" control, in view of the altered characteristics of the circuit. If so, the steps outlined above should be repeated.

Calibration of the instrument for intermediate values of the resistance in the light path is accomplished by adjustment of the "LO-CAL" resistor 18. With eight sheets of cellophane in the light path, the resistor 18 is adjusted to bring the system to a state of balance with the indicator 64 reading "0800."

Similarly, calibration for conditions in the higher range of resistances in the light path may be accomplished by adjustment of the "HI-CAL" control. With sixteen sheets of cellophane disposed in the light path, the system is brought to a state of balance with the indicator 64 reading "1600" by adjusting the tap 38 along the potentiometer coil 40.

It will be evident, of course, that adjustment of any one of the adjustable elements in the circuit has some effect upon the electrical characteristics of other portions of the circuit. Consequently, it frequently is necessary to repeat the entire series of calibrating steps several times. In this way, the margin of change effected each time is minimized and the system is brought to a condition which is satisfactory for practical purposes.

Figure 2:
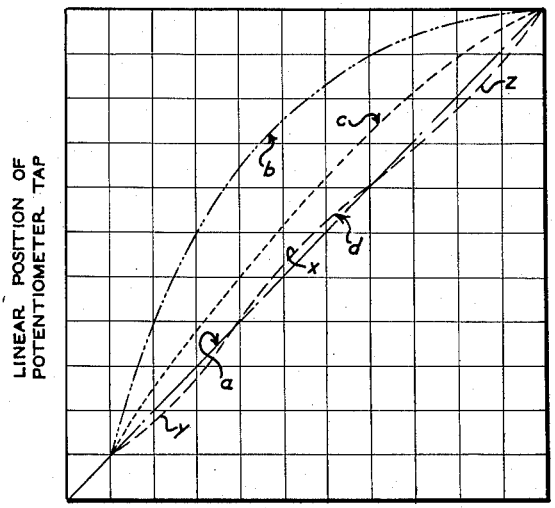
FIG. 2 is a chart depicting the effects produced by various components of the electrical circuit.

FIG. 2 is a diagrammatic representation of the effects produced by certain of the components of the circuit. It is a chart having a horizontal coordinate representing the number of sheets of cellophane being scanned and having a vertical coordinate representing the linear position of the tap 14 on the potentiometer 11. Assuming that the two coordinates have the same scale, it is desirable that the system function to produce a straight line $a$ extending upwardly from the origin at an angle of forty-five degrees. In other words, it is desirable that the number-of-fibers indication on the indicator 64 correspond to the number of fibers actually disposed in the scan line whenever the system is in a balanced state.

The curve $b$ approximates the curve which would be produced if the balancing circuit consisted merely of a single potentiometer such as 11. In this case, the curve approximates a logarithm curve, and it represents the situation which would prevail if there were no squaring unit, no adjustable load, no "LO-CAL," and no "HI-CAL." It will be observed that the curve $b$ deviates somewhat from the desired straight line and that, within the operating range of the system, the amount of deviation rises to a maximum and then decreases.

The curve $c$ represents the effect produced by employing a balance circuit made up solely of a squaring potentiometer unit 11, 12, 14, 16. This curve $c$ is considerably flatter than the curve $b$ and it provides a better approximation of the desired straight line.

A still closer approximation of the desired straight line is obtained when the loading resistance, the "HI-CAL," and the "LO-CAL" are employed in the circuit. The effects of these factors are suggested by the curve $d$. The load control 20 allows adjustment of the lower end portion $y$ of the curve. The "LO-CAL" resistor 18 shifts the middle portion $x$ of the curve downwardly to make it correspond more closely with the straight line $a$, but it also moves the upper end portion $z$ of the curve down too far. This may be corrected by the "HI-CAL" 40 which serves to raise the top portion $z$ of the curve $d$.

The "HI-CAL" control 40 in the bias circuit for the photocells 6 also counteracts dark current and compensates for scattering of the light passing through the sample. This control has relatively little effect at the lower values for number-of-fibers.

It will be understood, of course, that the curves shown in FIG. 2 are largely diagrammatic and that the actual situation prevailing in any given instrument may vary somewhat. Nevertheless, these curves may be helpful in providing a graphic representation of the effects produced by certain of the elements in the balancing system.

It will be understood also that the utility of the circuit means devoted to the generation of a logarithm function is not restricted to the particular instrument shown in FIG. 1. The circuit including the squaring potentiometers 11 and 12, the load resistance 20, 22 the "LO-CAL" 18, and the "HI-CAL" 40, may be employed wherever it is desired to generate a voltage bearing a logarithmic relationship to the positions of the taps 14 and 16 along the coils 11 and 12.

Still other variations and modifications will suggest themselves to persons skilled in the art. It is intended therefore that the foregoing be considered as exemplary only, and that the scope of the invention be ascertained from the following claims.

I claim:

1. Circuit means for generating a logarithmic function comprising a first potentiometer coil connected at one end to a source of electrical potential, a first tap of said coil, a second potentiometer coil connected at one end to said first tap, a resistance connected to ground and to the opposite ends of said coils, a second tap on said second coil, means for moving said taps in unison along said coils, a loading resistance connected to said second tap and to ground, and a bias resistance connected between said second tap and said source of electrical potential, whereby the potential at said second tap may be varied as a logarithmic function of the positions of said taps along said coils.

2. In an instrument of the type described having electrical means responsive to light, a source of light for said light responsive means, means for moving a sample across the path of light from said light source, and means for indicating the position of said sample-moving means; the improvement comprising circuit means connected to said light responsive means and including a squaring potentiometer unit and an adjustable load disposed in parallel with said unit; said unit including a first potentiometer coil connected to a source of electrical potential, a first tap movable along said first coil, a second potentiometer coil connected to said first tap, a second tap movable along said second coil, and means for moving said taps in unison; said load being connected to said second tap; and means for indicating the position of said taps.

3. In an instrument of the type described having a source of light and means for moving a fiber sample across the path of light from said light source; the improvement which comprises an electric circuit having light responsive means in position to receive light passing through the sample and having adjustable means for bringing the electrical potential of a point in the circuit to a predetermined value; said circuit including a first potentiometer coil connected at one end to a source of electrical potential, a first tap on said coil, a second potentiometer coil connected at one end to said first tap, an adjustable calibrating resistor connected to the opposite ends of said coils and to ground, a second tap on said second coil, an adjustable calibrating load resistor connected to said second tap and to ground, a third potentiometer coil connected in parallel with said load resistor, a third tap on said third coil, a resistor connected between said third tap and said light responsive means, a fourth calibrating potentiometer coil connected to a source of electrical potential, a fourth tap on said fourth coil, and a resistor connected between said fourth tap and said light responsive means; said first and second taps on said first and second potentiometer coils being mechanically coupled together for movement in unison; and means for indicating the position of said first and second taps.

4. In an instrument of the type described having a source of light and movable means for moving a fiber sample across the path of light from said light source, the improvement which comprises a light-sensitive cell positioned to receive light passing through the sample and having one of its terminals connected to a source of negative potential, circuit means connected between the opposite terminal of said cell and a source of positive potential, said circuit including adjustable means and having electrical properties such that the displacement of said adjustable means from a fiducial point is directly proportional to the number of fibers between the light source and the cell when the potential at said opposite terminal of said cell is zero, movable means connected to said adjustable means for displacing said adjustable means, a motor responding to the potential at said opposite terminal so as to move in one direction when the potential is positive and in the opposite direction when the potential is negative, said motor being coupled to one of said movable means so that movement of said motor automatically returns the potential at said opposite terminal to zero.

5. In an instrument of the type described having a source of light and movable means for moving a fiber sample across the path of light from said light source, the improvement which comprises an electric circuit having light responsive means in position to receive light passing through the sample and having adjustable means for bringing the electrical potential of a point in the circuit to a predetermined value, movable means connected to said adjustable means for displacing said adjustable means, said circuit having electrical properties such that the displacement of said adjustable means from a fiducial point is directly proportional to the number of fibers between the light source and the light responsive means when the potential at said point in said circuit is at said predetermined value, a motor responding to the potential at said point so as to move in one direction when the potential exceeds said predetermined value and in the opposite direction when the potential is less than said predetermined value, said motor being coupled to one of said movable means so that movement of said motor automatically restores the potential at said point to said predetermined value.

6. In an instrument of the type described having a source of light and means for moving a fiber sample across the path of light from said light source; the improvement which comprises an electric circuit having light responsive means in position to receive light passing through the sample and having adjustable means for bringing the electrical potential of a point in the circuit to a predetermined value; said circuit including a first potentiometer coil connected to a source of electrical potential and to ground, a first tap on said coil, a second potentiometer coil connected to said first tap and to ground, a second tap on said second coil, a load resistance connected to said second tap and to ground, a third potentiometer coil connected in parallel with said load resistance, a third tap on said third coil connected to said light responsive means, a fourth calibrating potentiometer coil connected to a source of electrical potential, a fourth tap on said fourth coil connected to said light responsive means; said first and second taps on said first and second potentiometer coils being mechanically coupled together for movement in unison.

7. In an instrument of the type described, a source of light; means for positioning a fiber sample in the path of light from said light source; light sensitive means in position to receive light passing through the sample; and electric circuit means including movable means and being connected to said light sensitive means for producing in response to a unit amount of displacement of said movable means a change in electrical potential directly proportional to the change in electrical potential produced by a unit amount of change in the number of fibers disposed in the path of light passing from said light source to said light sensitive means.

8. In an instrument of the type described, a source of radiation; means for positioning a fiber sample in the path of radiation from said source; radiation sensitive means in position to receive radiation passing through the sample; and electric circuit means including movable means and being connected to said radiation sensitive means for producing in response to a unit amount of displacement of said movable means a change in electrical potential directly proportional to the change in electrical potential produced by a unit amount of change in the number of fibers disposed in the path of radiation passing from said source to said radiation sensitive means.

9. In an instrument of the type described, a source of light; means for positioning a fiber sample in the path of light from said light source; light sensitive means in position to receive light passing through the sample; electric circuit means including movable means and being connected to said light sensitive means for producing in response to a unit amount of displacement of said movable means a change in electrical potential directly proportional to the change in electrical potential produced by a unit amount of change in the number of fibers disposed in the path of light passing from said light source to said light sensitive means, and means for indicating the displacement of said movable means.

References Cited in the file of this patent

UNITED STATES PATENTS

| | | |
|---|---|---|
| 2,299,983 | Hertel | Oct. 27, 1942 |
| 2,648,251 | Puster | Aug. 11, 1953 |
| 2,777,069 | Saeman | Jan. 8, 1957 |
| 2,871,429 | Fogiel | Jan. 27, 1959 |
| 2,909,722 | Cutler | Oct. 20, 1959 |
| 2,960,910 | Pelavin | Nov. 22, 1960 |

OTHER REFERENCES

Landee et al., Electronic Designers' Handbook, McGraw-Hill Book Co., Inc., 1957.